United States Patent Office

2,720,510
Patented Oct. 11, 1955

2,720,510

PROCEDURE FOR MANUFACTURE OF SYNTHETIC RUBBER

Alvin C. Rothlisberger, Borger, and Carl A. Uraneck, Phillips, Tex., assignors to Phillips Petroleum Company, a corporation of Delaware No Drawing. Application October 26, 1951,
Serial No. 253,444

23 Claims. (Cl. 260—83.5)

This invention relates to the polymerization of unsaturated organic compounds in aqueous emulsion, to produce synthetic rubber. In one of its more specific aspects this invention relates to a method providing for an improved efficiency of mercaptans as modifiers in the aqueous emulsion polymerization of unsaturated organic compounds to produce synthetic rubber.

It is well known that synthetic rubber can be produced by polymerization in aqueous emulsion of certain conjugated diene monomers alone or together with other unsaturated organic monomers copolymerizable therewith, employing a fatty acid soap as an emulsifier together with a modifier such as one or more alkyl mercaptans, particularly those containing from 10 to 18 carbon atoms in the molecule. In accordance with these methods the aqueous emulsion contains the polymerizable material, emulsifier, and modifier together with other ingredients, as for example activators, oxidants, and the like.

In effecting one form of such aqueous emulsion polymerization, particularly when a batch-type or semi-batch-type operation is carried out, the reactor is usually first charged with an aqueous medium which contains the desired emulsifying agent, and the monomeric material is then admixed with agitation of the contents. At the same time the modifier is also included usually in solution in at least a part of the monomeric material. An activator solution and an oxidant are separately added to the reaction mixture and reaction then proceeds. A preferred manner of adding these two latter constituents has been usually to have the activator solution incorporated in an aqueous medium prior to addition of the monomeric material, and then to add the oxidant as the last ingredient. It is also sometimes the practice to add portions of one or the other of the activator solutions and oxidant intermittently, or continuously during the course of the reaction. If the operation is carried out continuously, streams of the various ingredients are admixed in somewhat the same order prior to their final introduction into the polymerization reaction zone.

Various fatty acid soaps have been employed in variable quantities as emulsifying agents. Heretofore, the use of relatively small quantities of stearates as for example sodium stearate, has not generally been suitable particularly as applied to commercial scale operation, and accordingly, other fatty acid soaps that can be employed in smaller quantities, are often utilized. However, it is generally necessary to incorporate stearic acid with the synthetic rubber product during the compounding period. In such cases there is present in the rubber being compounded not only the added stearic acid but also free fatty acid resulting from the presence of the fatty acid soap initially employed (other than the stearate), the presence of which is undesirable inasmuch as excessive deterioration of the rubber often occurs due to the adverse effect of the presence of excess fatty acids in the finished rubber product. If an alkali metal stearate alone is employed as the emulsifier, a larger amount is generally needed than is equivalent to the proportions of stearic acid required for compounding, as a result of which an excess of free stearic acid is present in the compounded rubber, which is undesirable for the reasons stated above.

Our invention is based on our discovery that the efficiency of modification in an aqueous emulsion polymerization system of the type above described is greatly increased when employing a specific procedure described hereafter for charging the recipe ingredients to the polymerization system. As a result of the increased modification efficiency provided by our invention, we produce rubbery polymer product of greatly lowered Mooney viscosity. We can, when desired, employ a stearate as the sole emulsifying agent in such an amount that the stearic acid content of the finished acid coagulated rubber is that specified for compounding, thereby eliminating the need for adding stearic acid to the synthetic rubber during the compounding period, and eliminating the deleterious effects of excess amounts of fatty acid in the final product.

An object of our invention is to provide a process for the production of synthetic rubber. Another object is to provide for an improved modification efficiency in the aqueous emulsion polymerization of a monomeric material to produce a synthetic rubber. Another object is to provide for an improved utilization of alkyl mercaptans as modifiers in an aqueous emulsion polymerization system for producing synthetic rubber. Another object is to provide for the use of a stearate as an emulsifier in an aqueous emulsion polymerization system of the type above described, and for the concomitant presence of free stearic acid in the synthetic rubber product in an amount making it unnecessary to add stearic acid to the rubber while compounding same. Another object is to provide a synthetic rubber product of aqueous emulsion polymerization having a lowered Mooney viscosity as a result of employing a specific procedure for charging ingredients to the polymerization system. Other objects will be apparent to those skilled in the art from the accompanying discussion and disclosure.

In accordance with our invention we provide a specific charging procedure for incorporating the ingredients of an aqueous emulsion polymerization system employing one or more modifiers, for the production of synthetic rubber, whereby synthetic rubber product is formed having a Mooney value significantly lower than otherwise obtained. Our invention provides for an improved modification efficiency in such an aqueous emulsion polymerization system, and provides further for an improved utilization therein of stearic acid salts as emulsifiers, and, when desired, for eliminating the need of adding stearic acid to the synthetic rubber when compounding it.

In the practice of one embodiment of our invention we introduce the ingredients into the aqueous emulsion polymerization system in three different steps. In the first step water, fatty acid, a mercaptan modifier, and the monomeric material to be polymerized are introduced into the polymerization zone and the resulting admixture is then agitated until the fatty acid and mercaptan are dissolved in the monomer phase. The duration of this agitation period is generally from 5 to 60 minutes. This agitation is an important step. Unless the agitation is prolonged so as to completely dissolve the mercaptan and fatty acid in the monomer phase, the efficiency of the modification is unduly low. The order of charging the ingredients in this first step of our process can be varied. In one preferred method of operation in which a conjugated diene is copolymerized with another material, as for example in the copolymerization of butadiene and styrene, the fatty acid is charged with the mercaptan to the water, followed by addition of the styrene, and the resulting admixture is agitated until the fatty acid and mercaptan are dissolved in the monomer phase, after which time the conjugated diene is added.

In the second step we incorporate an alkali metal hydroxide with the admixture already in the polymerization zone under conditions such that the alkali metal hydroxide reacts with the fatty acid to form the fatty acid soap in situ, the resulting fatty acid soap serving as the emulsifier in the polymerization system. In carrying out the second step of our process, the alkali metal hydroxide is added, as an aqueous solution, generally about 1 N, in such a quantity that the pH of the system will be in the range of from 9 to 12, dependent upon the type polymerization recipe employed. The concentration of hydroxide in the aqueous alkali metal hydroxide solution added is not limited to 1 N but can be of any desired value. However, we find that unless a relatively highly concentrated hydroxide solution is employed, some difficulty may be encountered in maintaining the desired overall concentration of water in the polymerization system. The resulting alkali metal hydroxide-containing mixture in the polymerization zone is then agitated and brought to polymerization temperature. It is important that the admixture containing the alkali metal hydroxide be agitated for a sufficient time to permit complete reaction of the hydroxide with the fatty acid. The time required for this reaction will vary depending upon variables such as the fatty acid employed, the amount of water in the system, the type of agitator used, and the rate of agitation. However, a period generally in the range of from 5 minutes to 5 hours will be sufficient, but in some instances the time may be as high as 16–20 hours.

In the third and final step of our process we incorporate any remaining ingredients with the ingredients already in the polymerization zone, generally an activator and an oxidant. When a peroxide is employed it is generally added first, and the activator solution is then introduced into the resulting reaction mixture. However, this order of addition can be reversed if desired.

We have found that when employing the specific steps described above for charging ingredients to the polymerization zone, a greatly improved efficiency in the modifying action of the modifier results, over that obtained when employing conventional charging techniques of the type described hereinabove. The charging procedure of our invention is particularly efficient when employing recipes using a low emulsifier content, such as 2.5 parts or less by weight per 100 parts by weight of monomers. This feature of our invention is particularly advantageous when employing a stearate as the fatty acid salt emulsifier inasmuch as the fatty acid required to meet compounding specifications is already present in the synthetic rubber product and it is unnecessary to add more prior to compounding.

Fatty acids, which are converted in situ to the soap emulsifier in accordance with our invention may be either saturated or unsaturated, and contain from 12 to 20 carbon atoms in the molecule. The amount of fatty acid charged to the polymerization zone is generally within the limits of from 0.75 to 6 parts by weight per 100 parts by weight of total monomer added, about 0.75 to 2 parts by weight being most generally preferred. Although we prefer to use the fatty acid soap emulsifier alone, a supplementary emulsifier can be employed if desired, such as an alkyl aryl sulfonate, but this material is usually present in an amount not to exceed 1.5 parts by weight and generally not more than 1 part per 100 parts by weight of total monomer. Such a supplementary emulsifier serves as a stabilizer for the emulsion.

Polymerization temperatures are generally within the limits of —40 and 40° C. with temperatures in the range of 0 and 15° C. being preferred.

The monomeric material polymerized in accordance with the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing, a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacylamide and the like, methyl isopropenyl ketone, methyl vinyl ketone, methyl vinyl ether, vinyl acetate, vinyl chloride, vinylidene chloride, vinylfurane, vinylcarbazole, vinylacetylene and other unsaturated hydrocarbons, esters, alcohols, acids, ethers, etc., of the types described.

Our process is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

It has generally been preferred that the emulsion be of an "oil-in-water" type, with the ratio of aqueous medium to monomeric material between about 0.15:1 and about 2.75:1, in parts by weight.

It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase.

The total pressure on the reactants is preferably at least as great as the total vapor pressure of the mixture, so that the initial reactants will be present in liquid phase.

Emulsifying agents, i. e., fatty acid soaps, formed in situ in the practice of our invention include the alkali metal salts of fatty acids as for example, lauric, oleic, caprylic, palmitic, and stearic acid. The amount of emulsifier employed in the polymerization system is somewhat dependent on the relative amounts of monomeric material in aqueous phase, the reaction temperature, and the other ingredients of the polymerization mixture. Although an amount between about 0.8 and 7 parts per 100 parts of monomeric material can be used if desired, we often prefer to employ not more than 2.5 parts per 100 parts by weight of total monomers as already stated. This is particularly advantageous with respect to the use of a polymerization recipe providing for an alkali metal stearate in such an amount that the stearic acid content of the finished rubber product is that specified for compounding.

The pH of the aqueous phase may be varied over a rather wide range without producing deleterious effects on the conversion rate or the properties of the polymer. In general the pH can be within the range of 9 to 12, with the narrower range of 9.5 to 10.5 being most generally preferred, except when a polyamino compound is used as a reductant, in which case a somewhat higher pH is generally preferred.

The preferred mercaptan modifiers are alkyl mercaptans containing generally from 10 to 18 carbon atoms in the molecule. These mercaptan modifiers can be primary, secondary and tertiary alkyl mercaptans. The preferred mercaptan modifiers are those of tertiary configuation. Mixtues or blends of these mercaptans are frequently used and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$ and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

Although we have described our invention to a large extent in terms of mercaptans as modifiers, it is to be understood that our invention is applied to emulsion polymerization systems of the type described, employing any modifiers, such as for example, dialkyl dixanthogens, diaryl mono- and di- sulfides, tetraalkyl thiuram mono- and di- sulfides and mercaptothiazoles.

The following recipes are given as examples of some of the types of polymerization recipes that can be used in accordance with our invention, and are presented as being typical of those to which our invention is applied.

RECIPE

| Diazothioether | Iron Pyrophosphate (Redox) | Polyalkylene Polyamine |
|---|---|---|
| Conjugated monomeric diene.[1] Water. Modifier. Emulsifier. Diazothioether. | Conjugated monomeric diene.[1] Water. Modifier. Hydroperoxide. Emulsifier. Sugar (optional). Alkali-metal pyrophosphate. $FeSO_4.7H_2O$. | Conjugated monomeric diene.[1] Water. Electrolyte (optional). Alkali metal hydroxide (optional). Emulsifier. Modifier. Hydroperoxide. Polyalkylene polyamine. |

[1] A conjugated diene alone or together with an unsaturated organic material copolymerizable therewith.

Suitable hydroperoxides for use in iron pyrophosphate (redox) and polyalkylene polyamine recipes and other recipes calling for an oxygen-yielding material are preferably organic hydroperoxides having the formula RR'R"COOH wherein each of R, R', and R" is an organic radical, or R'R" together comprise a tetramethylene or pentamethylene group forming with the

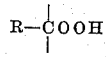

a cyclopentyl or cyclohexyl hydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e., mercapto compounds and thioethers), and halogen compounds. Examples of such hydroperoxides include diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl(ethoxyphenyl)hydroperoxymethane, methyl decyl(methylphenyl)hydroperoxymethane, dimethyldecylhydroperoxymethane, methylchlorophenylphenylhydroperoxymethane, and tertiary-butylisopropylbenzene hydroperoxide(dimethyl(tertiary-butylphenyl)-hydroperoxymethane).

The amount of hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i. e., when the monomeric material is measured in pounds the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide.

In the case of a diazothioether recipe, preferably diazothioethers have the formula R—N=N—S—R' where R and R' are aromatic groups containing substituents such as alkyl, chloro, nitro, methoxy, sulfonic acid group, and R' can also be cycloalkyl, substituted cycloalkyl, aliphatic and substituted aliphatic, and the like.

These compounds act both as initiators and as modifiers in a polymerization recipe and hence may be used as both catalysts and modifiers in the recipe. However it is preferred to use a mercaptan modifier along with the diazothioether in the practice of our invention. It is often desirable to use a catalyst such as potassium or sodium ferricyanide in conjunction with the diazothioether, in an amount such as between 0.03 and 1.0 part by weight per 100 parts by weight of monomeric material. Examples of suitable diazothioethers include 2-(2,4 - dimethyl - benzenediazomercapto)naphthalene, 2(4-methoxybenzenediazomercapto)naphthalene (known in the art as MDN), 2 - (2 - methylbenzenediazomercapto)naphthalene, 2 - (2,5 - dimethoxybenzenediazomercapto)naphthalene, 4 - (2,5 - dimethoxybenzenediazomercapto)toluene, 4 - (2 - naphthalenediazomercapto)anisole, 2 - (4 - acetylaminobenzenediazomercapto)naphthalene, 2 - (benzenediazomercapto)naphthalene, 2 - (4 - sulfobenzenediazomercapto)benzothiazole, 2 - (1 - naphthalenediazomercapto)naphthalene, 2 - (4 - chlorobenzenediazomercapto)naphthalene, 2-(5 - quinolinediazomercapto)naphthalene, 2 - (4 - nitrobenzenediazomercapto)naphthalene, and the like.

The type and amount of diazothioether used in a particular polymerization recipe depends upon the result desired. In general, approximately 0.2 part by weight of diazothioether per 100 parts of butadiene will give satisfactory promotion of the polymerization reaction although other proportions within the range of about 0.05 to about 5.0 parts by weight per 100 parts by weight of butadiene, can be used.

In the case of a polyalkylene polyamine recipe, the activating agent, i. e., a polyalkylene polyamine is preferably a polyethylene polyamine or a trimethylene polyamine. Suitable polyethylene polyamines have the general formula

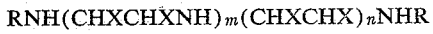

RNH(CHXCHXNH)$_m$(CHXCHX)$_n$NHR where R contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Examples of such polyethylene polyamines include ethylenediamine, hydrazine, diethylenetriamine, tetraethylenepentamine, di(methylethylene)triamine, N - (2 - hydroxyethyl) - 1,2-ethanediamine, N-phenylethylenediamine, N-cyclohexyl-N'-(2-aminoethyl)-1,2-ethanediamine, carbamates of the foregoing, and the like.

Suitable trimethylene polyamines are preferably those having the general formula

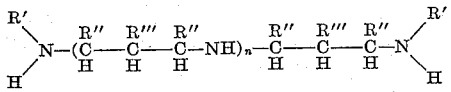

where each R' is one of the group consisting of hydrogen, methyl, ethyl, hydroxymethyl, hydroxyethyl, and carboxy radicals, each R'' is hydrogen or methyl, and each R''' is hydrogen, methyl, or an activating substituent of the group consisting of —OR, —SR, —NR$_2$, —CN, —SCN, —COOR, —CHO, with R being hydrogen, methyl, ethyl, $n$-propyl, or isopropyl or —CHR''' can be >C=O, and $n$ is an integer between 0 and 8 inclusive. The compounds containing a single trimethylene group together with its two terminal amino groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compound, can also be employed; for example tri(trimethylene)tetramine (sometimes erroneously designated as tripropylenetetramine) is considered to be a polymer of trimethylenediamine. All of the polyamino compounds referred to above have the basic structure of 1,3-diaminopropane and hence can be broadly referred to as "1,3-diaminopropane and its derivatives and polymers thereof;" they can also be broadly referred to as "1,3-diaminopropanes" and also as "trimethylene polyamines." It is preferred to use only those polyamines which come within the structural formula defined hereinabove, and all of the compounds so defined are operable in our process to some extent though it will be of course appreciated that the relative activities and efficacies will vary considerably depending upon the size of the molecule and the various constituents thereof, as well as upon the other components and their proportions in the various recipes which may be uesd. Those skilled in the art will readily ascertain any of the specific compounds which are within the scope of the structural formula. However, by way of example the following are mentioned; 1,3-diaminopropane, 1,3-diaminoacetone, 1,3-diamino-2-propanol, N,N'-dimethyl-1,3-diaminoacetone, N-ethoxy-1,3-diamino-2-propanol, 1,3-diamino-2-carboxypropane, 1,3-diamino-2-(dimethylamino)-propane, 2,4-diaminopentane, 1,3-diamino-2-cyanopropane, 1,3-diamino - 2 - mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the butadiene, except as such compounds may fortuitously be present as traces in the polymerization mixture. Similarly, no other reducing ingredient, such as a reducing sugar, need be added.

The amount of polyalkylene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of butadiene will give satisfactory results; however greater or smaller amounts of polyamine can be used.

The advantages of this invention are illustrated in the following examples. The reactants and their proportions and their specific ingredients are presented as being typical and should not be construed to limit the invention unduly.

*Example I*

The charging procedure of our invention, tabulated hereinbelow as procedure "A" was employed in conducting a butadiene-styrene copolymerization at 5° C., in accordance with the following recipe.

| | Parts by weight |
|---|---|
| Butadiene | 70 |
| Styrene | 30 |
| Water | 180 |
| KCl | 0.2 |
| Stearic acid | 1.32 |
| KOH, to give pH 10.3–10.5. | |
| Tert-C$_{12}$ mercaptan | 0.35 |
| Tert-butylisopropylbenzene hydroperoxide | 0.077 |
| FeSO$_4$.7H$_2$O | 0.0695 |
| K$_4$P$_2$O$_7$ | 0.0825 |

In carrying out procedure "A" the mercaptan was charged to the reactor containing the water and stearic acid, sufficient water having been withheld for preparation of the KOH and activator solutions. Styrene was then added and the resulting admixture agitated until all the stearic acid and mercaptan were dissolved, requiring about 15 minutes. Butadiene was then introduced into the polymerization zone, followed by addition of the KOH as a 1 N solution. The resulting admixture was agitated at room temperature for five minutes and then transferred to the polymerization bath (5° C.) wherein it was agitated for 45 minutes. The hydroperoxide (oxidant) was then added followed by addition of the ferrous sulfate-potassium pyrophosphate activator solution. The KCl was added as a component of the activator solution.

A "control" run was made using the conventional charging procedure, employing the same recipe. In this case potassium stearate was charged directly to the water in the reactor. Styrene and mercaptan were then added, followed by the addition of butadiene, and hydroperoxide.

The temperature was then adjusted, after which the activator solution was added. Further data pertinent to these runs are tabulated as follows:

|  | Conversion | | Mooney Value of Polymer Product (ML-4) |
|---|---|---|---|
|  | Time, Hours | Percent |  |
| Procedure "A" | 9.3 | 62 | 51 |
| "Control" procedure | 10.9 | 58 | 118 |

As shown in the foregoing tabulation, a polymer of greatly lowered Mooney value was obtained when employing our procedure "A" than was obtained when the control procedure was followed, and a more rapid conversion rate was also obtained.

Additional runs were made employing the above recipe in conjunction with the procedure "A" employing varied quantities of stearic acid and mercaptan, the quantities of ingredients being otherwise the same. The conversion rates were higher and the polymer products had lower Mooney values when employing the procedure "A" than when employing the control procedure above. Further data pertinent to these additional runs are tabulated as follows:

| Amount Added | | Conversion | | Mooney Value (ML-4) |
|---|---|---|---|---|
| Stearic Acid, Parts by weight | Mercaptan, Parts by weight | Time, Hours | Percent |  |
| 1.06 | 0.35 | 10.5 | 60 | 31 |
| 1.59 | 0.35 | 8.3 | 59 | 50 |
| 1.32 | 0.20 | 9.1 | 56 | 102 |
| 1.32 | 0.30 | 9.2 | 60 | 59 |

Example II

Charging procedure "A" of Example I was employed in conducting a series of butadiene-styrene copolymerizations at 5° C., in accordance with the following recipe, except that after the addition of KOH the reaction mixture, in each run, was agitated for a different period of time, prior to addition of the hydroperoxide and the activator ingredients. A run was also made in accordance with the following recipe, employing the control procedure of Example I.

| | Parts by weight |
|---|---|
| Butadiene | 70 |
| Styrene | 30 |
| Water | 180 |
| Stearic acid | 1.32 |
| KOH | 0.194 |
| Tert-$C_{12}$ mercaptan | 0.30 |
| Tert-butylisopropylbenzene hydroperoxide | 0.0527 |
| $FeSO_4 \cdot 7H_2O$ | 0.0695 |
| $K_4P_2O_7$ | 0.0825 |
| KCl | 0.20 |

Further data pertinent to these runs are tabulated as follows:

|  | Agitation at 5° C., Minutes | Conversion | | Mooney Value ML-4 |
|---|---|---|---|---|
|  |  | Time, Hours | Percent |  |
| Charging Procedure "A" | 10 | 21.2 | 71 | 53 |
| Do | 20 | 21.4 | 69 | 34 |
| Do | 60 | 21.4 | 66 | 27 |
| Do | 120 | 21.4 | 69 | 32 |
| Do | [1] 45 | 21.4 | 69 | 31 |
| Control Procedure |  | 21.4 | 61 | 73 |

[1] Five minutes agitation at room temperature after injection of KOH solution then 45 minutes at bath temperature (5° C.).

These above data demonstrate the importance of the agitation following addition of the alkali metal hydroxide, and that when the agitation time is varied within the limits of 5 and 60 minutes, the efficiency of modification is increased accordingly, as manifested by the lowered Mooney values of the polymer product.

Example III

The charging procedure "A" of Example I was employed in a butadiene-styrene copolymerization conducted at −10° C. in accordance with the following recipe. The trisodium phosphate and methanol were charged to the system, dissolved in the water component. The potassium ferricyanide and the 2-(4-methoxybenzenediazomercapto)naphthalene were charged last. Another run was made in accordance with this recipe employing the control procedure of Example I.

| | Parts by weight |
|---|---|
| Butadiene | 70 |
| Styrene | 30 |
| Water | 192 |
| Methanol | 48 |
| Stearic acid | 4.4 |
| Potassium hydroxide (to give a pH of 11.8) | 0.72 |
| 2-(4-methoxybenzenediazomercapto)naphthalene | 0.3 |
| $K_3Fe(CN)_6$ | 0.3 |
| n-$C_{16}$ mercaptan | 1.0 |
| Tert-$C_{16}$ mercaptan | 0.2 |
| $Na_3PO_4 \cdot 12H_2O$ | 0.5 |

Further data pertinent to these runs are tabulated s follows:

|  | Time, Hours | Conversion, percent | Mooney, ML-4 |
|---|---|---|---|
| Charging Procedure "A" | 44.5 | 66 | 97 |
| Control procedure | 44.5 | 68 | 150 |

These data demonstrate the advantages of the charging procedure of our invention as applied to a butadiene-styrene copolymerization, as manifested by the greatly lowered Mooney values obtained, when employing procedure "A."

Example IV

A series of polymerization runs employing the following recipe was made at −10° C. while varying the amount of mercaptan modifier in each run. The charging procedure "A" and the control procedure both described in Example I were employed at each mercaptan concentration. The trisodium phosphate and methanol were charged to the system, dissolved in the water component. The potassium ferricyanide and the 2-(4-methoxybenzenediazomercapto)naphthalene were charged last.

| | Parts by weight |
|---|---|
| Butadiene | 70 |
| Styrene | 30 |
| Water | 200 |
| Methanol | 50 |
| Potassium oleate* | 5 |
| KOH | 0.1 |
| $Na_3PO_4 \cdot 12H_2O$ | 0.5 |
| n-$C_{16}$ mercaptan | Variable |
| Tert-$C_{14}$ mercaptan | 0.20 |
| 2-(4-methoxybenzenediazomercapto)naphthalene | 0.3 |
| $K_3Fe(CN)_6$ | 0.3 |

* Sufficient oleic acid was used to give 5 parts potassium oleate.

Further data pertinent to these runs are tabulated as follows:

| $n$-$C_{16}$ Mercaptan, Parts by Weight | | Conversion | | Mooney, ML-4 |
|---|---|---|---|---|
| | | Time, Hours | Percent | |
| 0.20 | Control Procedure | 21.5 | 61 | 37 |
| 0.20 | Procedure "A" | 21.5 | 63 | 27 |
| 0.60 | Control Procedure | 21.5 | 63 | 36 |
| 0.60 | Procedure "A" | 21.5 | 66 | 30 |
| 1.00 | Control Procedure | 21.5 | 62 | 44 |
| 1.00 | Procedure "A" | 21.5 | 65 | 28 |

These data demonstrate an improved efficiency of modification at different mercaptan concentration levels, when employing a charging procedure of our invention, as manifested by the lowered Mooney values of the polymer product obtained when employing procedure "A."

*Example V*

Polybutadiene was prepared by emulsion polymerization at 30° C. in a series of runs in accordance with the following recipe, and employing two different concentrations of potassium stearate. The charging procedure "A" and the control procedure of Example I were employed at each concentration level. The Daxad–11 was charged to the system in solution with the water component. The dextrose and KCl were charged to the system with the activator.

|  | Parts by weight |
|---|---|
| Butadiene | 100 |
| Water | 180 |
| Stearic acid | 1.32 or 2.64 |
| KOH (to give a pH of 11.0) | 0.227 or 0.452 |
| Tert.-$C_{12}$ mercaptan | 0.35 |
| Daxad-11 * | 0.10 |
| KCl | 0.20 |
| Dextrose | 0.25 |
| $K_4P_2O_7$ | 0.018 |
| $FeSO_4.7H_2O$ | 0.014 |
| Cumene hydroperoxide | 0.025 |

\* Sodium salt of condensed alkyl aryl sulfonic acid.

Further data summarizing these runs are tabulated as follows:

| Potassium Stearate, Parts by weight | | Conversion | | Mooney, ML-4 |
|---|---|---|---|---|
| | | Time, Hours | Percent | |
| 1.5 | Procedure "A" | 16.5 | 57 | 29 |
| 1.5 | Control procedure | 16.5 | 42 | 110 |
| 3.0 | Procedure "A" | 16.5 | 64 | 50 |
| 3.0 | Control Procedure | 16.5 | 62 | 114 |

These data demonstrate the high modification efficiency obtained when employing an alkali metal stearate at different concentration levels, as the emulsifier, in conjunction with a charging procedure of our invention, whereas a very low modification efficiency is obtained when employing conventional charging procedures under otherwise identical conditions.

*Example VI*

Butadiene was copolymerized with ethyl acrylate in two separate runs at 5° C. in accordance with the following recipe employing in one run the charging procedure "A," and in the other run the control charging procedure, each illustrated in Example I.

|  | Parts by weight |
|---|---|
| Butadiene | 70 |
| Ethyl acrylate | 30 |
| Water | 180 |
| Stearic acid | 1.33 |
| KOH | 0.194 |
| Tert.-$C_{12}$ mercaptan | 0.3 |
| Tert.-butylisopropylbenzene hydroperoxide (33.7%) | 0.17 |
| $FeSO_4.7H_2O$ | 0.07 |
| $K_4P_2O_7$ | 0.0825 |

Further data summarizing these runs are tabulated as follows:

|  | Conversion | | Mooney, ML-4 |
|---|---|---|---|
| | Time, Hours | Percent | |
| Control Procedure | 11.0 | 57 | 126 |
| Procedure "A" | 11.0 | 64 | 52 |

These data demonstrate the advantages of the charging procedure of our invention as applied to a butadiene-ethyl acrylate copolymerization, as manifested by the lowered Mooney values obtained, when employing procedure "A."

*Example VII*

Isoprene was copolymerized with ethyl acrylate in two separate runs at 5° C. in accordance with the following recipe, and employing in one run the charging procedure "A," and in the other run, the control procedure, each charging procedure having been set forth in Example I. The KCl was charged to the system with the activator.

|  | Parts by weight |
|---|---|
| Isoprene | 70 |
| Ethyl acrylate | 30 |
| Water | 180 |
| Stearic acid | 1.5 |
| KOH | 0.252 |
| KCl | 0.20 |
| Tert.-$C_{12}$ mercaptan | 0.25 |
| Tert.-butylisopropylbenzene hydroperoxide | 0.229 |
| $FeSO_4.7H_2O$ | 0.278 |
| $K_4P_2O_7$ | 0.330 |

Further data pertinent to these runs are tabulated as follows:

|  | Conversion | | Mooney ML-4 |
|---|---|---|---|
| | Time, Hours | Percent | |
| Procedure "A" | 6.6 | 77 | 29 |
| Control Procedure | 6.6 | 60 | 84 |

These data demonstrate the advantages of the charging procedure of our invention as applied to an isoprene-ethyl acrylate copolymerization, as manifested by the lowered Mooney values obtained, when employing procedure "A."

*Example VIII*

Butadiene and styrene were copolymerized at 5° C. in accordance with the following recipe employing various charging procedures as indicated in the following tabulations:

| | Parts by weight |
|---|---|
| Butadiene | 70 |
| Styrene | 30 |
| Water | 180 |
| Stearic acid | 1.32 |
| KOH | 0.187 |
| KCl * | 0.2 |
| Tert.-$C_{12}$ mercaptan | 0.35 |
| $FeSO_4.7H_2O$ | 0.116 |
| $K_4P_2O_7$ | 0.097 |
| Diox 7 ** (100 per cent) | 0.080 |
| Temperature | ° C__ 5 (41° F.) |

\* Charged to the system as a component of the activator.
\*\* Tert-butylisopropylbenzene hydroperoxide.

| Run No. | Emulsifier Type | Emulsifier Preparation | Ingredients Present at Time of Emulsifier Preparation | | | | | Conversion Percent | | | | Final Conversion | | Mooney Viscosity, ML-4 |
|---|---|---|---|---|---|---|---|---|---|---|---|---|---|---|
| | | | t-C₁₂SH | Bd | Styrene | Diox 7 | Act. | 5.1 Hrs. | 11.1 Hrs. | 24 Hrs. | 26 Hrs. | Time, Hours | Percent | |
| 1 | Potassium Stearate | in situ | (*) | (*) | (*) | None | None | 27 | 61 | | | 11.3 | 64 | 84 |
| 2 | ---do--- | ---do--- | (*) | (*) | (*) | (*) | None | 28 | 64 | | | 11.3 | 66 | 95 |
| 3 | ---do--- | ---do--- | (*) | (*) | (*) | (*) | (*) a | 25 | 55 | | | 12.1 | 57 | 143 |
| 4 | ---do--- | Normal | | | | | | 27 | 57 | | | 11.3 | 59 | 128 |

\* Present.
a KOH added to activator solution and the mixture injected into the system.

In run No. 1 the charging procedure "A" of Example I was employed. In run No. 2 the same procedure was employed, except that the oxidant was added prior to addition of the KOH and prior to agitation of the admixture to promote the in situ formation of the soap emulsifier. In run No. 3 the KOH was added to the activator solution, and the resulting mixture was then injected into the system. In run No. 4, a conventional charging procedure similar to the control procedure of Example I was employed.

The above data demonstrate the importance of charging the ingredients to the aqueous emulsion polymerization system in exact accordance with the charging procedure of our invention, as manifested by the low Mooney value of the polymer product of run No. 1 above, obtained when employing charging procedure "A" of Example I. The Mooney value of the polymer obtained as a product of run No. 2 above, demonstrates that a lowered modification efficiency results, even when the charging procedure of our invention is slightly altered. The data further demonstrate that in situ formation of the emulsifier alone is not in itself the sole reason for the unexpected results of our invention, but it is the specific combination of charging steps already described that provides for the improved modification of our invention.

When referring herein to "Mooney value" it is meant the Mooney viscosity as determined in accordance with the ASTM method D927–47J.

Many modifications of this invention will be apparent to those skilled in the art upon study of the accompanying disclosure. Such modifications, being clearly apparent from this disclosure are believed to be within the spirit and scope of this invention.

We claim:

1. In a method for charging ingredients to an aqueous emulsion polymerization system for producing synthetic rubber, wherein said emulsion comprises a monomeric material comprising a conjugated diene, water, a mercaptan as a modifier, an alkali metal fatty acid soap as an emulsifier, an activator, and an oxidant, the improvement comprising introducing said water, said mercaptan, said monomeric material, and a fatty acid in an amount stoichiometrically equivalent to said soap, into the zone of said polymerization, agitating the resulting admixture so as to completely dissolve said fatty acid and said mercaptan in said monomeric material, introducing an aqueous alkali metal hydroxide into admixture with said fatty acid-containing admixture in an amount to react with said fatty acid to form said soap and to render a resulting soap-containing admixture having a pH of from 9 to 12, agitating the resulting hydroxide-containing admixture under temperature conditions so as to form said soap, whereby said emulsion is formed, and introducing said activator and said oxidant into admixture with the emulsion so formed.

2. The improvement of claim 1 wherein said oxidant is a peroxide and is introduced into said emulsion prior to the introduction thereto of said activator.

3. The improvement of claim 1 wherein said fatty acid consists essentially of stearic acid and said emulsion contains not more than 2.5 parts by weight of alkali metal 4. The improvement of claim 1 wherein said fatty acid contains from 12 to 20 carbon atoms in the molecule, and wherein said alkyl mercaptan contains from 10 to 18 carbon atoms in the molecule.

5. The improvement of claim 4 wherein said alkyl mercaptan is a tertiary alkyl mercaptan.

6. The improvement of claim 1 wherein said monomeric material comprises a major amount of a conjugated diene and a minor amount of an organic compound copolymerizable therewith and containing the structure $CH_2=C<$.

7. The improvement of claim 6 wherein said fatty acid and said mercaptan are charged to water in the zone of said polymerization, followed by the introduction of said copolymerizable material into the resulting water-containing admixture, and the admixture so formed is agitated until all said fatty acid and said mercaptan is dissolved in said copolymerizable material, and wherein said conjugated diene is then added to the resulting solution of fatty acid, mercaptan, and copolymerizable material.

8. The improvement of claim 1 wherein from 0.75 to 6 parts of fatty acid per 100 parts by weight of total monomeric material is charged to the zone of said polymerization.

9. The improvement of claim 1 wherein the time of the first said agitation is within the limits of 5 and 60 minutes, and the time of the second said agitation is within the limits of 5 minutes and 20 hours.

10. An improved process for the preparation of synthetic rubber, comprising the steps of introducing a monomeric material comprising a conjugated diene, together with water in an amount set forth hereafter, from 0.05 to 0.3 part of an alkyl mercaptan containing from 10 to 18 carbon atoms per molecule, from 0.75 to 6 parts of a fatty acid containing from 12 to 20 carbon atoms in a molecule into a polymerization zone; agitating the resulting admixture for a period of from 5 to 60 minutes, thereby dissolving said mercaptan and said fatty acid in said monomeric material; admixing aqueous alkali metal hydroxide with the resulting solution of fatty acid, mercaptan, and monomeric material, in an amount to render the resulting hydroxide-containing admixture at a pH of from 9 to 12; agitating the resulting hydroxide-containing admixture for a period of from 5 minutes to 20 hours, whereby said fatty acid and said hydroxide react with each other to form an alkali metal soap and an aqueous emulsion is concomitantly formed; establishing the temperature of said aqueous emulsion at a level within the limits of −40 to 40° C.; introducing from 0.1 to 10 millimols of an organic oxidant, and from 0.1 to 3 millimols of an iron pyrophosphate complex activator into said emulsion, the total amount of water in said emulsion being within the limits of 15 and 275 parts, said parts herein being parts by weight per 100 parts by weight of total monomeric material.

11. An improved process for the preparation of synthetic rubber, comprising the steps of introducing a monomeric material comprising a conjugated diene, together with water in an amount set forth hereafter, from 0.05 to 0.3 part of an alkyl mercaptan containing from 10 to 18 carbon atoms per molecule, from 0.75 to 6 parts of a fatty acid containing from 12 to 20 carbon atoms in a molecule into a polymerization zone; agitating the resulting admixture for a period of from 5 to 60 minutes, thereby dissolving said mercaptan and said fatty acid in said monomeric material; admixing aqueous alkali metal hydroxide with the resulting solution of fatty acid, mercaptan, and monomeric material, in an amount to render the resulting hydroxide-containing admixture at a pH of from 9 to 12; agitating the resulting hydroxide-containing admixture for a period of from 5 minutes to 20 hours, whereby said fatty acid and said hydroxide react with each other to form an alkali metal soap and an aqueous emulsion is concomitantly formed; establishing the temperature of said aqueous emulsion at a level within the limits of —40 and +40° C.; introducing from 0.2 to 5.0 parts of a diazothioether, and from 0.03 to 1.0 parts of an alkali metal ferricyanide into said emulsion; the total amount of water in said emulsion being within the limits of 15 and 275 parts, said parts herein being parts by weight per 100 parts by weight of total monomeric material.

12. An improved process for the preparation of synthetic rubber, comprising the steps of introducing a monomeric material consisting essentially of a major proportion of 1,3-butadiene and a minor proportion of styrene, together with water in an amount set forth hereafter, from 0.05 to 0.3 part of a tertiary alkyl mercaptan containing from 12 to 16 carbon atoms in the molecule, and from 0.75 to 2 parts of stearic acid into a polymerization zone; agitating the resulting admixture for a period of from 5 to 60 minutes, thereby dissolving said mercaptan and said stearic acid in said monomeric material; admixing aqueous alkali metal hydroxide with the resulting solution of stearic acid, mercaptan and monomeric material in an amount to render the resulting hydroxide-containing admixture at a pH from 9 to 12; agitating the resulting hydroxide containing admixture for a period of from 5 minutes to 5 hours, whereby said stearic acid and said hydroxide react with each other to form an alkali metal soap and an aqueous emulsion is concomitantly formed; establishing the temperature of said aqueous emulsion at a level within the limits of 0 and 15° C.; introducing from 0.1 to 10 millimols of an organic hydroperoxide, and from 0.1 to 3 millimols of an iron pyrophosphate complex activator into said emulsion; the total amount of water in said emulsion being within the limits of 15 and 275 parts; said parts herein being parts by weight per 100 parts by weight of total monomeric material.

13. The process of claim 12 wherein said hydroperoxide is tert-butylisopropylbenzene hydroperoxide.

14. The process of claim 12 wherein said stearic acid and said mercaptan are charged to water in the zone of said polymerization, followed by introduction of said styrene into the resulting water-containing admixture, and wherein said butadiene is introduced into the water-containing admixture subsequent to the first said agitation.

15. The process of claim 10 wherein said monomeric material consists essentially of 1,3-butadiene and ethyl acrylate, said fatty acid is from 0.75 to 2 parts of stearic acid, wherein said mercaptan is a tertiary alkyl mercaptan containing from 12 to 16 carbon atoms in the molecule and wherein the time of the second said agitation does not exceed 5 hours.

16. The process of claim 10 wherein said monomeric material consists essentially of a major amount of isoprene and a minor amount of ethyl acrylate, wherein said fatty acid is from 0.75 to 2 parts of stearic acid, wherein said mercaptan is a tertiary alkyl mercaptan containing from 12 to 16 carbon atoms in the molecule and wherein the time of the second said agitation does not exceed 5 hours.

17. In a method for charging ingredients to an aqueous emulsion polymerization system for producing synthetic rubber, the improvement comprising the steps of introducing water, a modifier and a monomeric reactant material comprising a conjugated diene to be polymerized, together with a fatty acid to be converted to form soap emulsifier, into the zone of said polymerization, agitating the resulting admixture so as to dissolve said fatty acid and said modifier in said monomeric material, introducing into the resulting fatty acid-containing admixture an aqueous alkali metal hydroxide for reacting with said fatty acid therein to form said soap and to render a resulting soap containing admixture having a pH of from 9 to 12, agitating the resulting hydroxide-containing admixture under temperature conditions so as to form said soap, whereby said emulsion is formed, and introducing at least a portion of at least one of any activator and oxidant ingredients into admixture with the emulsion so formed.

18. The improvement of claim 6 wherein said conjugated diene is 1,3-butadiene and said copolymerizable organic compound is styrene.

19. The improvement of claim 1 wherein said monomeric material is solely 1,3-butadiene.

20. The improvement of claim 6 wherein said conjugated diene is 1,3-butadiene and said copolymerizable organic compound is ethyl acrylate.

21. The improvement of claim 6 wherein said conjugated diene is isoprene and said copolymerizable organic compound is ethylacrylate.

22. The improvement of claim 17 wherein oxidant and activator ingredients are added to said system and wherein at least a portion of said oxidant is added prior to formation of said emulsion.

23. In a method for charging ingredients to an aqueous emulsion polymerization system for producing synthetic rubber, the improvement comprising the steps of introducing a modifier and a monomeric reactant material comprising a conjugated diene to be polymerized, together with fatty acid to be converted to form a soap emulsifier, into the zone of said polymerization, agitating the resulting admixture so as to dissolve said fatty acid and said modifier in said monomeric material, introducing into the resulting fatty acid-containing admixture an alkali metal hydroxide for reacting with said fatty acid therein to form said soap and to render a resulting soap-containing admixture having a pH of from 9 to 12, introducing water into the system at a time prior to completion of the agitating hereinafter described, agitating the resulting hydroxide-containing admixture under temperature conditions so as to form said soap, whereby said emulsion is formed, and introducing at least a portion of at least one of any activator and oxidant ingredients into admixture with the emulsion so formed.

References Cited in the file of this patent

UNITED STATES PATENTS 2,382,812     Parker                Aug. 14, 1945

OTHER REFERENCES

"Emulsions," Carbide and Carbon Chemicals Co., N. Y., 4th edition, July 1934, pages 38 and 39.